United States Patent
Blatchley et al.

(10) Patent No.: US 10,556,484 B2
(45) Date of Patent: Feb. 11, 2020

(54) VEHICLE CLIMATE CONTROL VALVE AND OPERATING METHOD

(71) Applicant: FORD GLOBAL TECHNOLOGIES, LLC, Dearborn, MI (US)

(72) Inventors: Timothy Noah Blatchley, Dearborn, MI (US); James George Gebbie, Rochester Hills, MI (US); Clay Wesley Maranville, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 370 days.

(21) Appl. No.: 14/925,228

(22) Filed: Oct. 28, 2015

(65) Prior Publication Data

US 2017/0120718 A1   May 4, 2017

(51) Int. Cl.
| | | |
|---|---|---|
| *B60H 1/00* | (2006.01) | |
| *B60H 3/02* | (2006.01) | |
| *G05D 23/19* | (2006.01) | |

(52) U.S. Cl.
CPC ....... *B60H 1/0065* (2013.01); *B60H 1/00028* (2013.01); *B60H 1/00278* (2013.01); *B60H 1/00485* (2013.01); *B60H 1/00821* (2013.01); *B60H 1/00921* (2013.01); *B60H 3/022* (2013.01); *G05D 23/19* (2013.01); *G05D 23/1919* (2013.01); *B60H 2001/00307* (2013.01); *B60H 2001/00928* (2013.01)

(58) Field of Classification Search
CPC ............ B60H 1/00278; B60H 1/0028; B60H 1/0065; B60H 1/00735; B60H 1/00485; F24F 11/0008; F24F 11/37; F24F 11/00
See application file for complete search history.

(56) References Cited

U.S. PATENT DOCUMENTS

| | | | |
|---|---|---|---|
| 6,035,651 A | 5/2000 | Carey | |
| 7,975,757 B2 * | 7/2011 | Nemesh | B60H 1/00278 165/42 |
| 8,607,855 B2 | 12/2013 | Feuerecker et al. | |
| 2005/0225429 A1 * | 10/2005 | Burzio | B60R 25/04 340/5.24 |
| 2006/0283411 A1 * | 12/2006 | Lou | F01L 9/02 123/90.12 |
| 2007/0278437 A1 * | 12/2007 | Takaiwa | F16K 31/04 251/129.11 |

(Continued)

FOREIGN PATENT DOCUMENTS

| | | | |
|---|---|---|---|
| EP | 3051218 A4 * | 8/2017 | |
| JP | 2013082330 A * | 5/2013 | |

OTHER PUBLICATIONS

Otto Egelhof GmbH & Co., Heat Pump Valves—Accessed Aug. 10, 2015 at http://www.egelhof.com/egelhof/us/autoklima/heatpumpvalves.php.

*Primary Examiner* — Devon Russell
(74) *Attorney, Agent, or Firm* — David Kelley; Carlson, Gaskey & Olds, P.C.

(57) ABSTRACT

An exemplary vehicle climate control operating method includes in a cooling mode, moving a valve to a first position and initializing the valve without moving the valve to a second position. In a heating mode, the method moves the valve to a second position and initializing the valve without moving the valve to the first position. The first position permits more flow than the second position.

3 Claims, 6 Drawing Sheets

(56) References Cited

U.S. PATENT DOCUMENTS

| | | |
|---|---|---|
| 2010/0242508 A1* | 9/2010 | Lifson .................... F24F 3/1405 |
| | | 62/115 |
| 2011/0109157 A1 | 5/2011 | Tani |
| 2012/0179329 A1 | 7/2012 | Okamoto et al. |
| 2013/0019615 A1* | 1/2013 | Choi ........................ B60H 1/00 |
| | | 62/79 |
| 2015/0013367 A1 | 1/2015 | Carpenter |
| 2015/0210141 A1 | 7/2015 | Ragazzi |
| 2016/0280041 A1* | 9/2016 | Suzuki ............... B60H 1/00921 |
| 2017/0089614 A1* | 3/2017 | Miyagi .................... F25B 7/00 |

* cited by examiner

VEHICLE CLIMATE CONTROL VALVE AND OPERATING METHOD

TECHNICAL FIELD

This disclosure relates generally to valves within a climate control system of a vehicle and, more particularly, to varying how the valves are initialized. The varying is in response to an expected mode.

BACKGROUND

Generally, electrified vehicles differ from conventional motor vehicles because electrified vehicles are selectively driven using one or more battery-powered electric machines. Conventional motor vehicles, in contrast to electrified vehicles, are driven exclusively using an internal combustion engine. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Vehicles, particularly electrified vehicles, can include a climate control system having valves. The valves control flow of fluids, such as a refrigerants, through the system. Starting the climate control system involves initializing its valves. Each of the valves is initialized by moving the valve to both a fully open position and a fully closed position. Initializing the valves essentially calibrates the valves so that the system can then position the valve to permit or block a desired amount of flow.

SUMMARY

A vehicle climate control operating method according to an exemplary aspect of the present disclosure includes, among other things, in a cooling mode, moving a valve to a first position and initializing the valve without moving the valve to a second position. In a heating mode, the method moves the valve to a second position and initializes the valve without moving the valve to the first position. The first position permits more flow than the second position.

In a further non-limiting embodiment of the foregoing method, the method includes, in a dehumidification mode, moving the valve to the second position and initializing the valve without moving the valve to a first position.

In a further non-limiting embodiment of any of the foregoing methods, the method includes, in the heating mode, moving the valve to a throttling position after the initializing. The throttling position permits less flow than the first position and more flow than the second position.

In a further non-limiting embodiment of any of the foregoing methods, the initializing is during a start-up cycle of a climate control system for a vehicle.

In a further non-limiting embodiment of any of the foregoing methods, the first position is a fully open valve position, and the second position is a fully closed valve position.

In a further non-limiting embodiment of any of the foregoing methods, the method includes selecting the heating mode or the cooling mode based at least in part on a measurement of a temperature inside a cabin of a vehicle.

In a further non-limiting embodiment of any of the foregoing methods, the method includes controlling flow to a heat exchanger using the valve.

In a further non-limiting embodiment of any of the foregoing methods, the method includes exchanging thermal energy between the fluid and ambient air at the heat exchanger.

In a further non-limiting embodiment of any of the foregoing methods, the valve is a first valve and the heat exchanger is a first heat exchanger. The method further includes, in the heating mode and the cooling mode, moving a second valve to a fully closed position and initializing the second valve without moving the second valve to a fully open position.

A vehicle climate control system according to another exemplary aspect of the present disclosure includes, among other things, a first valve actuated to control flow to a first heat exchanger along a fluid circuit, a second valve actuated to control flow to a second heat exchanger along the fluid circuit, and a controller configured to initialize the first and second valves in a cabin cooling mode with the first valve in a flow permitting position and the second valve in a flow restricting position.

In a further non-limiting embodiment of the foregoing system, the controller is configured to initialize the first and second valves in the cabin cooling mode without the first valve moving from a flow permitting position to a flow restricting position and without the second valve moving from a flow restricting position to a flow permitting position.

In a further non-limiting embodiment of any of the foregoing systems, the controller is further configured to initialize the first and second valves in a cabin heating mode with the first and second valves in flow restricting positions.

In a further non-limiting embodiment of any of the foregoing systems, the controller is further configured to initialize the first and second valves in a cabin dehumidification mode with the first and second valves in flow restricting positions.

In a further non-limiting embodiment of any of the foregoing systems, the flow permitting position is a nominally fully open position, and the flow restricting position is a nominally fully closed position.

An assembly of a climate control system according to yet another exemplary aspect of the present disclosure includes, among other things, a valve configured to initialize in a first position when operating in a cooling mode, and configured to initialize in a second position when operating a heating mode, the first position permitting more flow of a fluid than the second position.

In a further non-limiting embodiment of the foregoing assembly, the valve is further configured to initialize in the second position in a dehumidification mode.

In a further non-limiting embodiment of any of the foregoing assemblies, the valve is a needle valve.

In a further non-limiting embodiment of any of the foregoing assemblies, the first position is a fully open position, and the second position is a fully closed position.

In a further non-limiting embodiment of any of the foregoing assemblies, the fluid flows to the valve from a heater and flows from the valve to a heat exchanger.

In a further non-limiting embodiment of any of the foregoing assemblies, the heat exchanger is configured to exchange thermal energy between the fluid and ambient air.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to valves of a climate control system of a vehicle. In particular, the disclosure is directed toward varying how one or more of the valves is initialized based on an operating mode for the system. Varying how the valves initialize can reduce the time that the system spends initializing valves, so that the system can more quickly deliver conditioned air to vehicle occupants.

Figure 1:
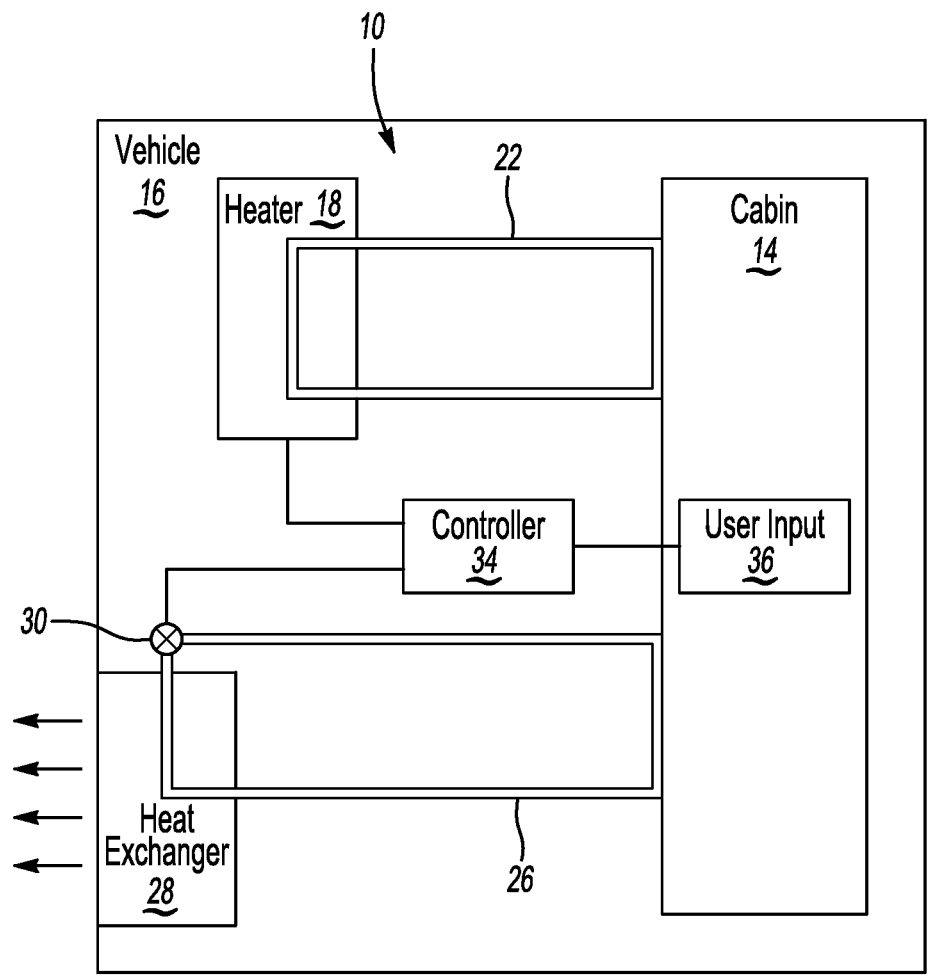
FIG. 1 shows a highly schematic view of selected portions of a climate control system for a vehicle.

Referring to FIG. 1, an example climate control system 10 provides conditioned air to a cabin 14 of a vehicle 16. The example system 10 includes a first fluid circuit 22 extending from the cabin 14 to a heater 18, and a second fluid circuit 26 extending from the cabin 14 to a heat exchanger 28. The system 10 further includes a valve 30 actuated to control flow through the second fluid circuit 26. A controller 34 is operably connected to the cabin 14, the heater 18, and the valve 30.

The system 10 can operate in a heating mode or a cooling mode. In some examples, the system 10 can also operate in a dehumidification mode. In the heating mode, the controller 34 commands the heater 18 to heat a fluid within a portion of the first fluid circuit 22. A pump (not shown) circulates the heated fluid along the first fluid circuit 22 to a position near the cabin 14. The heated fluid is used to heat the cabin 14.

In the cooling mode, the controller 34 commands the valve 30 to move to a position that permits flow of a fluid along the second fluid circuit 26. Flow along the second fluid circuit carries thermal energy from the cabin 14 to the heat exchanger 28. At the heat exchanger 28, heat moves from fluid within the second fluid circuit 26 to ambient. A fan (not shown) can be used to move air through portions of the heat exchanger 28 to facilitate movement of thermal energy from fluid in the second fluid circuit 26 to ambient.

The controller 34 can initiate the heating mode or the cooling mode in response to, for example, an input from a driver of the vehicle 16 during a start-up of the vehicle 16. The controller 34, for example, can receive a temperature request from a user input 36 within the cabin 14. The controller 34 compares the temperature request to an actual temperature within the cabin 14, a temperature outside the vehicle 16, or both. Based on the comparison, the controller 34 can initiate the heating mode or the cooling mode. The actual temperatures can be measure by sensors operatively connected to the controller 34.

When the controller 34 initiates the heating mode and commands the heater 18 to heat fluid within the first fluid circuit 22, the controller 34 commands the valve 30 to move to a flow restricting position, such as a position that blocks flow along the second fluid circuit 26. This prevents cooling the cabin 14 during the heating mode.

When the controller is operating in the cooling mode, the controller moves the valve 30 to a fully open position, or to a throttled position between the fully opened position and a fully closed position. The positioning of the valve 30 in the cooling mode depends upon a desired amount of cooling for the cabin 14. If more cooling is desired, the valve 30 is moved to a position that permits more flow. If less cooling is desired, the controller commands the valve 30 to move to a position that permits less flow.

The controller 34 can turn off the heater 18 in the cooling mode so that the heater 18 is not heating fluid in the first fluid circuit, which could heat the cabin 14 and inhibit the effectiveness of using the cooling mode to cool the cabin 14.

The controller 34 can include a processor operatively linked to a memory portion. The processor can be programmed to execute a program stored in the memory portion. The program can be stored in the memory portion as software code.

The program stored in the memory portion can include one or more additional or separate programs, each of which includes an ordered listing of executable instructions for implementing logical functions associated with heating and cooling the cabin 14. The instructions, for example, enable the controller 34 to command the valve 30 to adjust to a position that permits or blocks a desired amount of flow through the second fluid circuit 26.

Figure 2:
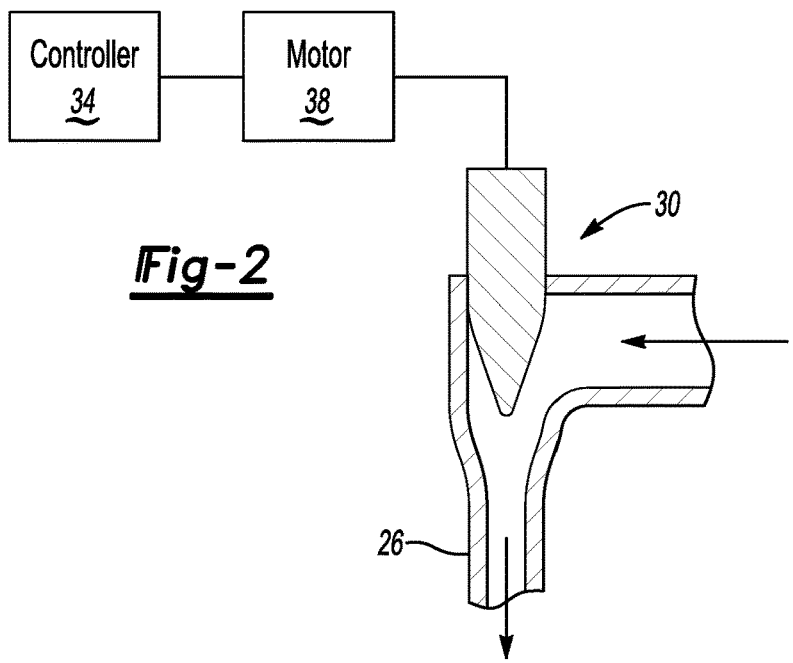
FIG. 2 shows a valve from the system of FIG. 1 in a fully open position.
Figure 3:
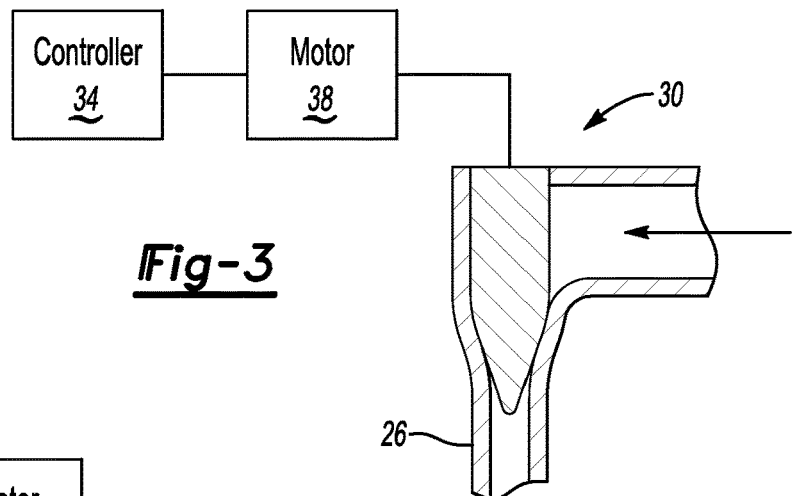
FIG. 3 shows the valve of FIG. 2 in a fully closed position.
Figure 4:
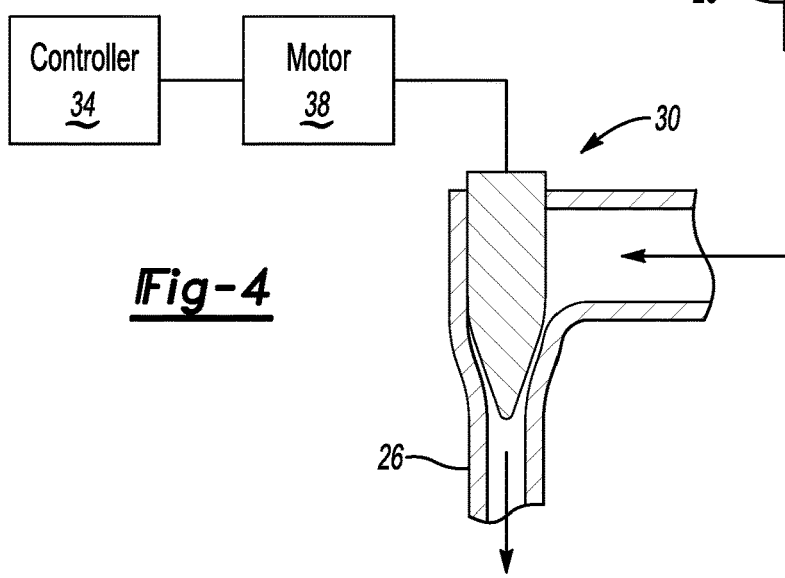
FIG. 4 shows the valve of FIG. 3 in a throttling position.

Referring now to FIGS. 2 to 4 with continuing reference to FIG. 1, the example valve 30 is a needle valve that is actuated by a motor 38. Other types of valves could be used in other examples.

In this example, the motor 38 receives commands from the controller 34 and, in response, can move the valve 30 from the open position of FIG. 2 to the closed position of FIG. 3. The motor 38 can further move the valve 30 from the closed position of FIG. 3 to the open position of FIG. 2, and to throttling positions in between the open position of FIG. 2 and the closed position of FIG. 3. An example of a throttling position is shown in FIG. 4. The controller 34 thus controls the flow along the second fluid circuit by commanding the motor 38 associated with the valve 30. In this example, initializing the valve 30 is required to calibrate the valve 30.

In some systems, initializing a valve involves moving the valve to both a fully open position and then to a fully closed position. The valve needs to move to both the fully open and fully closed position so that a controller learns where these positions are, and can then move the valve to an appropriate position for the system to heat or cool a cabin. Moving a valve to both a fully open position and a fully closed position when initializing the valve takes time and can delay heating or cooling of the cabin. In some examples, by moving the valve to both a fully open and a fully closed position when initializing can take up to twelve seconds.

The example valve 30 can be initialized by moving the valve 30 to the open position of FIG. 2 or the closed position of FIG. 3. Moving the valve to both the open position of FIG. 2 and the closed position of FIG. 3 is not required to initialize the valve 30.

In this example, the controller 34 initializes the valve 30 differently based on whether the system 10 will operate in the heating mode or the cooling mode. In the cooling mode, the controller 34 commands the motor 38 to move to the valve 30 to the fully open position of FIG. 2 when initializing, but not the fully closed position of FIG. 3. In the heating mode, the controller 34 commands the motor 38 to move the valve 30 to the fully closed position of FIG. 3 when initializing, but not the fully open position of FIG. 2. Initializing the valve 30 without moving the valve 30 to both a fully open and a fully closed position reduces the time necessary to initialize the valve 30.

Figure 5:
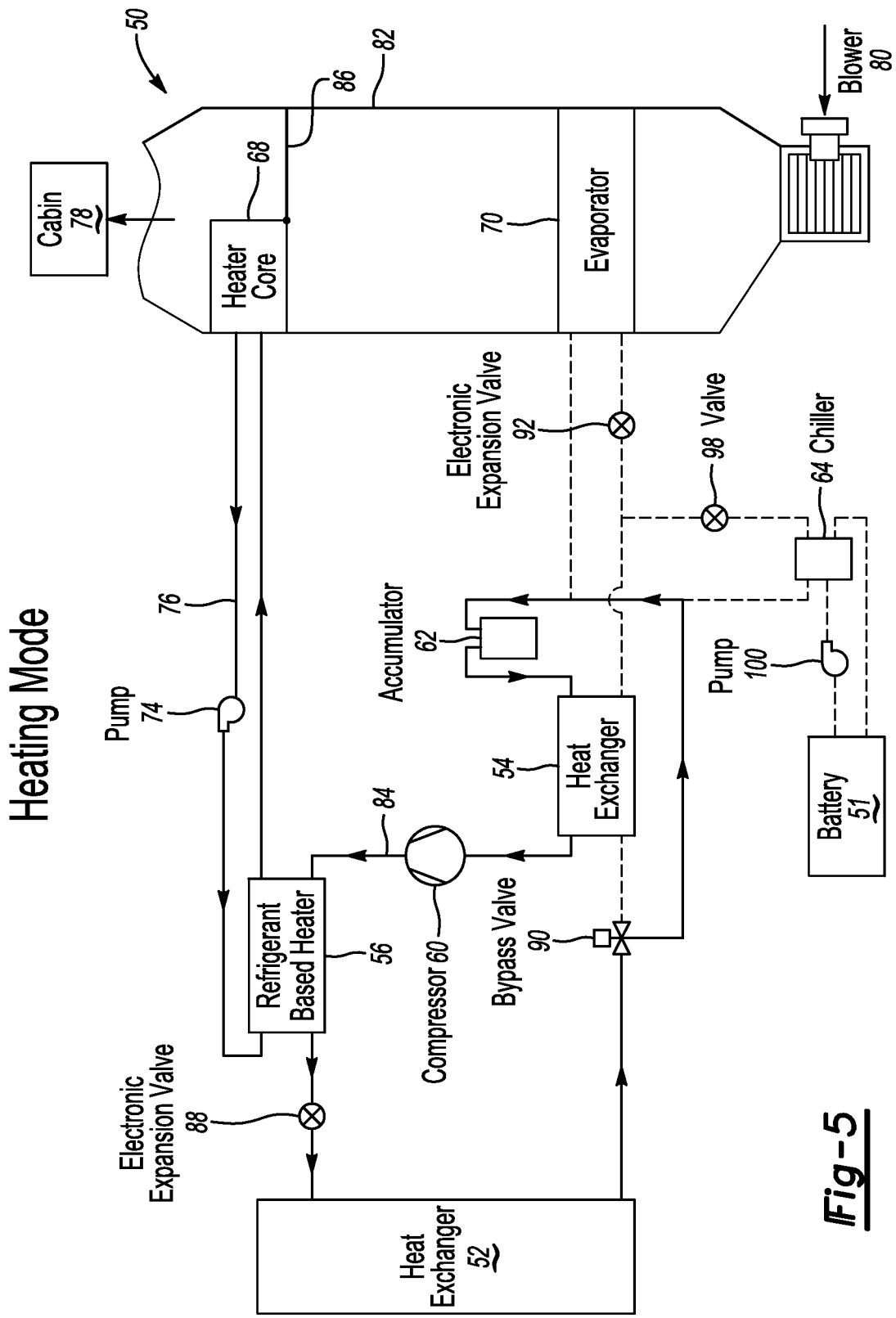
FIG. 5 shows a schematic view of another example climate control system for a vehicle in a heating mode.
Figure 6:
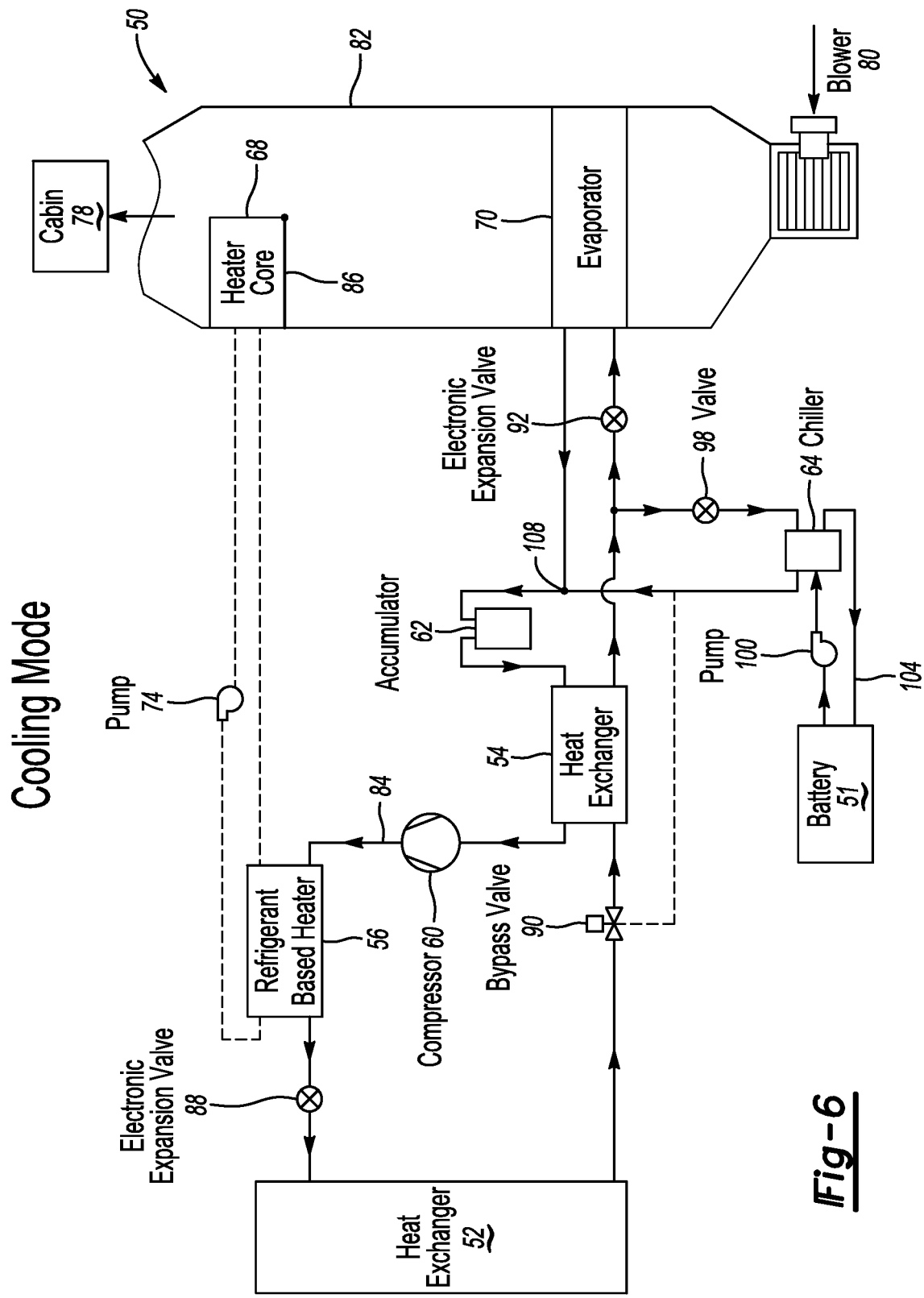
FIG. 6 shows the system of FIG. 5 in a cooling mode.
Figure 7:
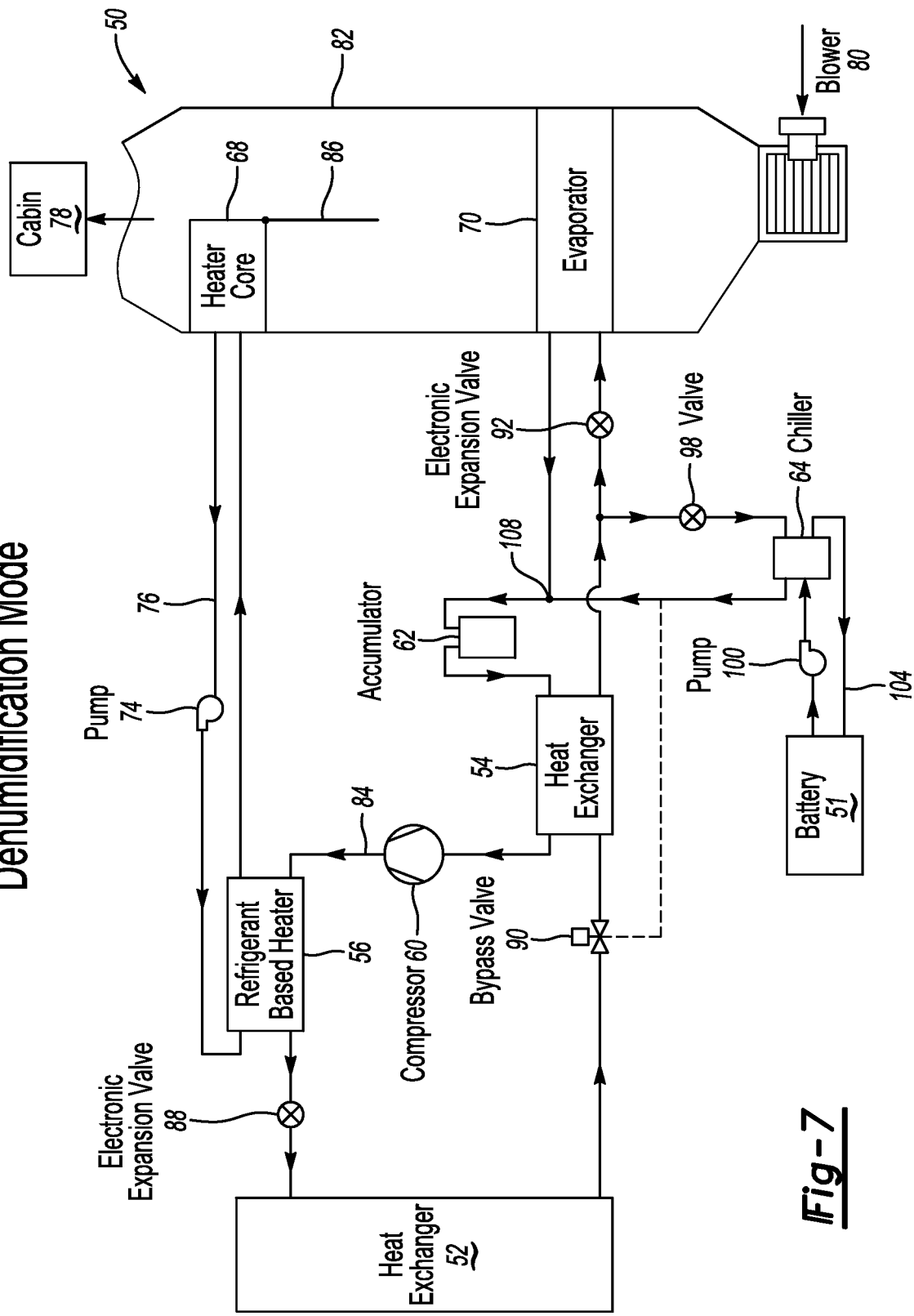
FIG. 7 shows the system of FIG. 5 in a dehumidification mode.

Referring now to FIGS. 5 to 7, another example climate control system 50 is incorporated within an electrified vehicle that includes a battery 51 selectively utilized to drive wheels of the vehicle. The battery 51 is a relatively high voltage traction battery.

In an exemplary embodiment, the climate control system 50 includes a heat exchanger 52, a heat exchanger 54, a heater 56, a compressor 60, an accumulator 62, a chiller 64, a heater core 68, an evaporator 70, and a pump 74. The system 50 is considered to comprise a heat pump. The system 50 uses multiple fluid circuits and fluids, such as a refrigerant, and a mix of glycol and water. The system 50 can heat, cool, and dehumidify a cabin of the electrified vehicle. Components of the system 50 can be in fluidic communication via one or more conduits, such as tubes, hoses, or the like.

FIG. 5 shows the system 50 in a heating mode wherein the pump 74 moves a fluid, such as coolant, along a first fluid circuit 76 to circulate coolant between the heater 56 and the heater core 68. Heated coolant moves from the heater 56 along the first fluid circuit 76 to the heater core 68. A blower 80 moves air through a duct 82. The blower 80 moves air to the heater core 68 within the duct 82.

The heater core 68 is located near the cabin 78 of the vehicle in a section of a ventilation subsystem within an HVAC case and could embody any suitable configuration. In one embodiment, the heater core 68 is configured as a plate-fin or tube-fin heat exchanger. However, other heater core configurations are contemplated as within the scope of this disclosure. In another embodiment, the heater core 68 is located within of the cabin 78.

Heated air moves from the heater core 68 in the duct 82 to a cabin 78 of the vehicle to heat the cabin. In the heating mode, an actuatable door 86 within the duct 82 is positioned to direct flow from the blower 80 through the heater core 68. Other actuatable doors can be located elsewhere within the HVAC case to control and manipulate flow of air through the HVAC case.

In the heating mode, a second fluid, such as a refrigerant, passes through the heater 56 along a second fluid circuit 84. The example heater 56 is a refrigerant based heater. At the heater 56, heat moves from refrigerant in the second fluid circuit 84 to coolant in the first fluid circuit 76. Refrigerant then moves from the heater 56 along the second fluid circuit 84 through an expansion device, such as an electronic expansion valve 88, to the heat exchanger 52. The valve 88 is adapted to change the pressure of the refrigerant of the second fluid circuit 84. The valve 88 is heating electronic expansion valve (HEXV) in this example. High pressure refrigerant received from the heater 56 exits the valve 88 at a lower pressure and as a liquid and vapor mixture in the heating mode.

In the heating mode, the expansion valve 88 is maintained in a throttling position, which corresponds generally to a position between a fully open position for the expansion valve 88 and a fully closed position for the expansion valve 88. The throttling position could be a fully open position in some examples. A motor can be initiated by a controller to position the expansion valve 88 in the throttling position.

After passing through the heater 56, the refrigerant picks up thermal energy from ambient at the heat exchanger 52. The heat exchanger 52 is an outside heat exchanger as the heat exchanger 52 exchanges thermal energy between the refrigerant and ambient air outside the vehicle. Refrigerant moves along the second fluid circuit 84 from the heat exchanger 52 to a bypass valve 90 which directs the refrigerant to the accumulator 62. The accumulator 62 directs the refrigerant through the heat exchanger 54 to the compressor 60.

In this example, the bypass valve 90 is a solenoid valve that can be positioned to selectively permit the refrigerant within the second fluid circuit to bypass the heat exchanger 54. In the heating mode, effectively no thermal energy exchange occurs within the heat exchanger 54.

The compressor 60 pressurizes and circulates the refrigerant through the second fluid circuit 84. The compressor 60 can be powered by an electrical or non-electrical power source. For example, the compressor 60 can be operatively coupled to an internal combustion engine of the vehicle.

The refrigerant within the second fluid circuit 84 is compressed at the compressor 60 and directed back to the heater 56. The refrigerant entering the heater 56 along the second fluid circuit 84 is hotter than the refrigerant entering the heater along the first fluid circuit 76.

Referring now to FIG. 6, the system 50 is shown in a cooling mode. When operating in the cooling mode, the bypass valve 90 retracts to permit the second fluid circuit 84 to pass through the heat exchanger 54 and to prevent refrigerant from bypassing the heat exchanger 54. In the cooling mode, refrigerant moves from the heat exchanger 54 and then through an expansion device, such as an electronic expansion valve 92, to the evaporator 70, which is positioned within the duct 82. The valve 92 is adapted to change the pressure of the refrigerant of the second fluid circuit 84. The valve 92 is a cooling electronic expansion valve (CEXV) in this example.

The blower 80 directs air through the evaporator 70. The air is cooled within the duct 82 as the air passes through the evaporator 70. The cooled air then moves from the duct 82 into the cabin to cool the cabin. The door 86 is moved to a position that blocks flow through the heater core 68.

Fluid moves along the second fluid circuit 84 from the evaporator 70 back to the accumulator 62 and through the heat exchanger 54 where thermal energy moves from the flow that will enter the evaporator 70 to the flow that has exited the accumulator 62. Flow that has been heated at the heat exchanger 54 then moves through the compressor 60, through the heater 56, through the expansion valve 88, through the heat exchanger 52. In the cooling mode, the heat exchanger 52 operates as a condenser and provides flow to the heat exchanger 54.

In the cooling mode, the expansion valve 88 is maintained in a fully open or nominally fully open position to permit maximum flow to the heat exchanger 52. In the cooling mode, the expansion valve 92 is positioned in a throttling position to permit a desired flow along the second fluid circuit 84 to the evaporator 70. Adjusting the expansion valve 92 adjusts flow to the evaporator 70, and thus the cooling effect of the evaporator 70 on the flow of air moving through the duct 82.

In the cooling mode, some fluid moving along the second fluid circuit 84 passes through an expansion device, such as an expansion valve 98, to the chiller 64. The valve 98 can be a passive thermal expansion valve with a shut-off position. In other examples, the valve 98 is an electronic expansion device.

Also, a pump 100 circulates fluid, such as a coolant, along a third fluid circuit 104. Coolant moving along the third fluid circuit 104 circulates between the chiller 64 and the battery 51. The chiller 64 cools coolant moving along the third fluid circuit 104. The cooled coolant circulates from the chiller 64 to the battery 51 to cool the battery 51. Refrigerant from the heat exchanger 54 that has passed through the valve 98 and the chiller 64 is reintroduced to fluid from the evaporator 70 at a position 108 upstream from the accumulator 62.

In other examples, the third fluid circuit 104 cools other components instead of, or in addition to, the battery 51. The third fluid circuit 104 could be used to, for example, cool electric machines, inverter system controllers, DC/DC convertors, etc.

Referring now to FIG. 7, the system 50 is shown in a dehumidification mode. Coolant moves along the first fluid circuit 76 in the dehumidification mode in the manner described in connection with FIG. 5. Refrigerant moves along the second fluid circuit 84 in the manner described in connection with FIG. 6. Coolant moves along the third fluid circuit 104 in the dehumidification mode in the manner described in connection with FIG. 6.

In the dehumidification mode, the valves 88 and 92 are maintained in respective throttling positions to provide desired flow along the second fluid circuit 84 to the heat exchanger 52 and to the evaporator 70. Air moves through the duct 82 passing through the evaporator 70 and the heater core 68 to dehumidify the cabin of the vehicle. Adjustments to the throttling positions of the valves 88 and 92 can be made to control flow to provide desired humidification to the cabin. In the dehumidification mode, some evaporation takes place at the evaporator 70 and additional evaporation takes place at the heat exchanger 52. The door 86 can be moved to an intermediate position to selectively permit flow through or around the heater core 68.

Figure 8:
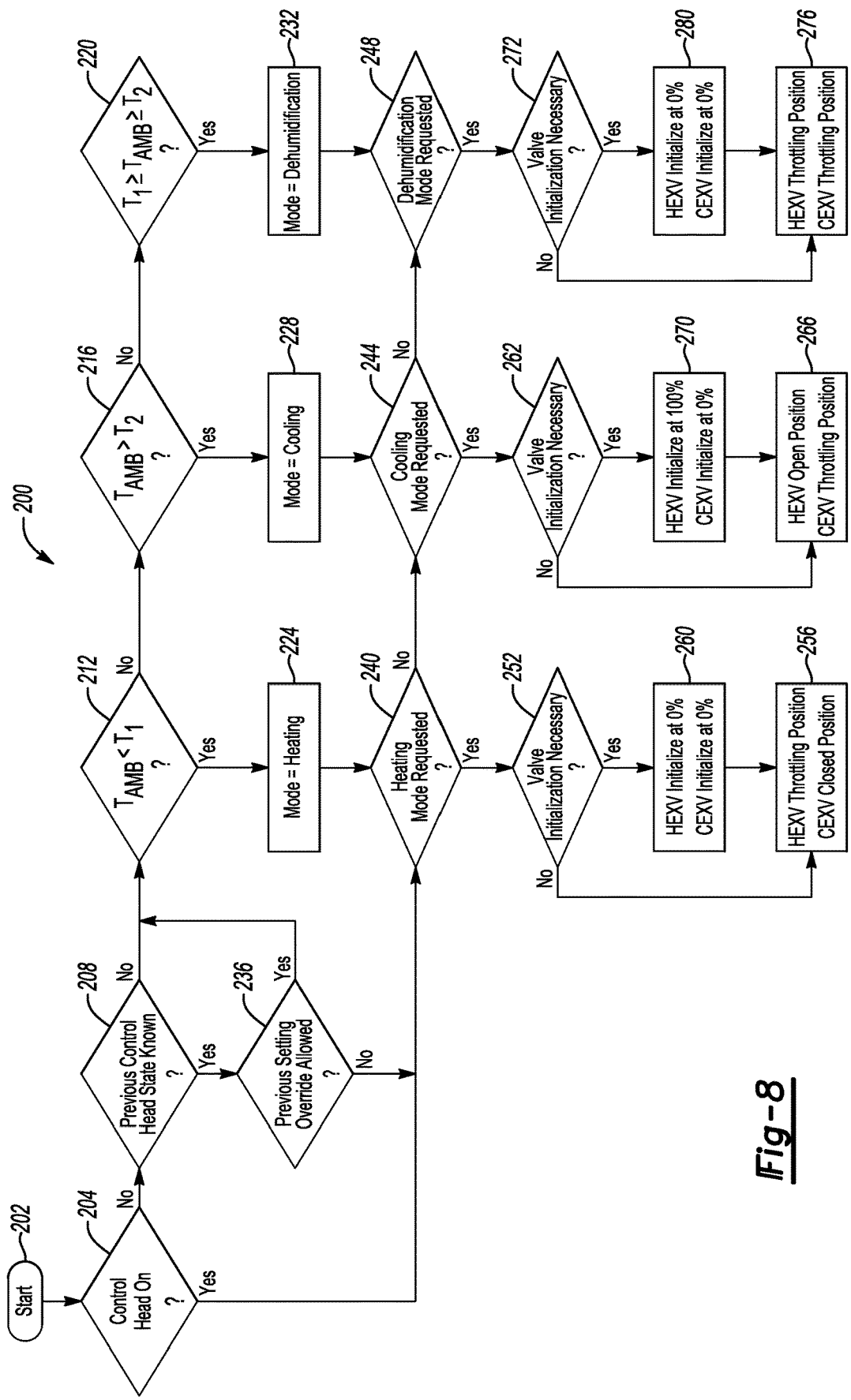
FIG. 8 shows steps in a method of controlling valves in the system of FIGS. 5 to 7.

Referring now to FIG. 8 with continuing reference to FIGS. 5 to 7, a vehicle climate control operating method 200 used in connection with the system 50 starts at a step 202. The method 200 could be executed on a programmable controller used in connection with the system 50. In this example, the method 200 operates continually when the vehicle is operating during a drive cycle.

From the step 202, the method moves to a step 204. At the step 204, the method 200 assess whether a control head is on. An input from an operator interacting with a climate control input screen on a center stack of the vehicle turns the control head on in some examples. If the control head is not on, the method moves to a step 208, which assesses whether a previous control head state is known. If, for example, during a previous drive cycle the vehicle was provided with an operator input corresponding to maintaining a cabin at 68 degrees Fahrenheit and this information was saved, the previous control head state would be known.

If the previous control state is not known at the step 208, the method moves to a step 212, which compares an ambient temperature $T_{AMB}$, which is a temperature outside the vehicle in this example, to a threshold temperature $T_1$. The threshold temperature $T_1$ is calibratable and can represent an ambient temperature below which the operator would typically select the heating mode. If the ambient temperature $T_{AMB}$ is not less than the temperature $T_1$, the method moves to a step 216, which assesses whether the ambient temperature $T_{AMB}$ is greater than an threshold temperature $T_2$. The threshold temperature $T_2$ is calibratable and can represent an ambient temperature above which the operator would typically select the cooling mode. If the ambient temperature $T_{AMB}$ is not above the upper temperature limit $T_2$, the method moves to a step 220 where the ambient temperature $T_{AMB}$ of the cabin 78 is considered between the acceptable lower temperature $T_1$ and the acceptable upper temperature $T_2$.

If, at the step 212, the ambient temperature $T_{AMB}$ is less than the lower temperature limit $T_1$, the method 200 interprets this as a heating mode request at a step 224. If not, the method 200 moves to the step 216.

If, at the step 216, the ambient temperature $T_{AMB}$ is greater than the upper acceptable temperature $T_2$, the method 200 interprets this as a cooling mode request at a step 228. If not, the method 200 moves to the step 220.

At the step 220, the ambient temperature $T_{AMB}$ of the cabin is within an acceptable range of temperatures. The method 200 thus interprets this as a dehumidification mode request at a step 232.

Returning to the step 208, if the previously control head state is known, the method 200 moves to a step 236, which assesses whether a previous setting override is allowed. If an override is allowed, the method moves to the step 212. If an override is not allowed, the method 200 moves from the step 236 to a step 240 which assesses whether the heating mode has been requested.

At the step 240, if the request for heating has not come from the control head at the step 204 or the interpretation of the heating mode request at the step 224, the method 200 moves to a step 244, which assesses whether the cooling mode has been requested. The cooling mode request can come from the control head step 204 or from an interpretation of the cooling mode request from the step 228. If the cooling mode has not been requested, the method 200 moves to the step 248 which assesses that the dehumidification mode has been requested.

If, at the step 240, the heating mode has been requested from the control head at the step 204 or the interpretation of the heating mode request at the step 224, the method 200 assesses at a step 252 if valve initialization is necessary. Since the method 200 is running, in this example, continually during a drive cycle, valve initialization may not be necessary at the step 252 as the valves 88 and 92 have been initialized during start-up of the vehicle. If valve initialization is not necessary at the step 252, the method moves to a step 256, which maintains the expansion valve 88 in the throttling position and places the expansion valve 92 in a closed position. If valve initialization is not necessary at the step 252, the valves 88 and 92 should not require repositioning. Valve initialization may not be required if the step 252 is reached midway through a drive cycle because the valve was already initialized at the beginning of drive cycle. Again, the example method 200 is running continually throughout the drive cycle.

If, at the step 252, valve initialization is necessary, the method 200 moves to the step 260, which initializes the expansion valve 88 by moving the expansion valve 88 to a fully closed position and without moving the expansion valve 88 to a fully open position. At the step 260, the method 200 initializes the expansion valve 92 by moving the expansion valve 92 to a fully closed position and without moving the expansion valve 92 to a fully open position. After initialization at the step 260, the method 200 moves to the step 256 to place the expansion valve 88 in the throttling position and maintain the expansion valve 92 in the closed position.

At the step 244, if the cooling mode has been requested, the method 200 moves to the step 262, which determines if valve initialization is necessary. If not, the method 200 moves from the step 262 to the step 266, which maintains the expansion valve 88 in an open position and the expansion valve 92 in a throttling position.

If, at the step 262, valve initialization is necessary, the method 200 moves to the step 270. At the step 270, the method 200 initializes the expansion valve 88 by moving the valve to a fully open position and without moving the valve to a fully closed position. At the step 270, the method 200 initialized the expansion valve 92 by moving the expansion valve 92 to a fully closed position and without moving the expansion valve 92 to a fully open position. The method 200 then moves from the step 270 to the step 266, which maintains the expansion valve 88 in the open position and positions the expansion valve 92 in a throttling position.

If the heating mode is not requested at the step 240 and the cooling mode is not requested at the step 244, the method 200, at the step 248 assesses that the dehumidification mode has been requested. The method 200 moves from the step 248 to a step 272, which assesses whether valve initialization is necessary. If not, the method 200 moves to the step 276, which maintains the expansion valve 88 in a throttling position and the expansion valve 92 in a throttling position.

If, at the step 272, valve initialization is necessary, the method 200 moves to the step 280, which initializes the expansion valve 88 by moving the expansion valve 88 to a fully closed position and without moving the expansion valve 88 to a fully open position, and further initializes the expansion valve 92 by moving the expansion valve 92 to a fully closed position and without moving the expansion valve 92 to a fully open position. After initializing the valves at the step 280, the method 200 moves to the step 276, which positions the expansion valve 88 in a throttling position and the expansion valve 92 in a throttling position.

After the steps 256, 266, and 276, the method returns to the start 202.

Features of some of the disclosed examples include a system for controlling a climate within a cabin of a vehicle. The system initializes valves of the system differently depending upon a requested mode. This reduces time spent initializing and desirably reduces time required to heat the cabin, cool the cabin, or both.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle climate control operating method, comprising:

initializing a valve differently based on whether a climate control system will operate in a heating mode or a cooling mode;

for the cooling mode, moving the valve to a first position and initializing the valve without moving the valve to a second position; and for the heating mode, moving the valve to a second position and initializing the valve without moving the valve to the first position, the first position permitting more flow than the second position, wherein the initializing is during a start-up of the vehicle, and further comprising using a previous control head state of the vehicle when assessing whether the climate control system will operate in the heating mode or the cooling mode, wherein, if the previous control head state of the vehicle is not known, comparing an ambient temperature outside the vehicle to a first threshold temperature to assess whether the climate control system will operate in the heating mode, and comparing the ambient temperature to a different, second threshold temperature to assess whether the climate control system will operate in the cooling mode.

2. The vehicle climate control operating method of claim 1, wherein the start-up beginning a current drive cycle of the vehicle, and further comprising relying on an operator input from a previous drive cycle of the vehicle when assessing whether the climate control system will operate in the heating mode or the cooling mode.

3. The vehicle climate control operating method of claim 1, further comprising, operating the climate control system in a dehumidification mode in response to the ambient temperature being between the first threshold temperature and the second threshold temperature.

* * * * *